(12) United States Patent
Lopez et al.

(10) Patent No.: US 7,393,391 B2
(45) Date of Patent: Jul. 1, 2008

(54) FABRICATION OF AN ANISOTROPIC SUPER HYDROPHOBIC/HYDROPHILIC NANOPOROUS MEMBRANES

(75) Inventors: Gabriel P. Lopez, Albuquerque, NM (US); Plamen B. Atanassov, Albuquerque, NM (US); Dmitri A. Brevnov, Albuquerque, NM (US); Marcos Barela, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 443 days.

(21) Appl. No.: 10/969,341

(22) Filed: Oct. 21, 2004

(65) Prior Publication Data

US 2006/0037477 A1 Feb. 23, 2006

Related U.S. Application Data

(60) Provisional application No. 60/514,224, filed on Oct. 24, 2003.

(51) Int. Cl.
*B01D 53/22* (2006.01)
*B01D 71/06* (2006.01)
*B01D 67/00* (2006.01)

(52) U.S. Cl. .................. 96/11; 96/12; 96/13; 95/45; 210/490; 210/500.21; 210/500.27; 427/490; 427/255.6; 427/535; 427/245

(58) Field of Classification Search ............ 96/4, 96/10, 11, 12, 13, 14; 95/45; 210/650, 651, 210/490, 500.21, 500.23, 500.27; 427/488, 427/480, 255.6, 532, 535, 245; 205/75
See application file for complete search history.

(56) References Cited

U.S. PATENT DOCUMENTS

| | | | | |
|---|---|---|---|---|
| 4,410,338 A | * | 10/1983 | Yamamoto et al. | ............. 96/10 |
| 4,687,551 A | * | 8/1987 | Furneaux et al. | ............. 205/75 |
| 4,696,686 A | * | 9/1987 | Usami et al. | ................ 96/13 |
| 4,806,246 A | * | 2/1989 | Nomura | ............. 210/500.23 |
| 5,019,140 A | * | 5/1991 | Bowser et al. | ................. 96/6 |
| 5,376,347 A | * | 12/1994 | Ipponmatsu et al. | ......... 423/338 |
| 5,514,276 A | * | 5/1996 | Babcock et al. | ............ 210/490 |

OTHER PUBLICATIONS

Martin, "Membrane-Based Synthesis of Nanomaterials", American Chemical Society, Chem. Matter, 1996, 8, pp. 1739-1746.
Shingubara, "Fabrication of Nanomaterials Using Porous Alumina Templates", Journal of Nanoparticles Research 5, pp. 17-30, 2003.

(Continued)

*Primary Examiner*—Jason M Greene
(74) *Attorney, Agent, or Firm*—MH2 Technology Law Group LLP

(57) ABSTRACT

Anisotropic hydrophobic/hydrophilic nanoporous membranes and methods of forming anisotropic hydrophobic/hydrophilic nanoporous membranes are disclosed. The method of forming the nanoporous membrane includes growing a nanoporous oxide film on a substrate. A nanoporous membrane having a top side and a bottom side can then be formed by partially separating the nanoporous oxide film from the substrate. A fluorocarbon film can be deposited on the top side of the nanoporous membrane by plasma polymerization. The disclosed anisotropic hydrophobic/hydrophilic nanoporous membranes can have extremely different hydrophobicity between the top side and the bottom side of the nanoporous membrane.

24 Claims, 3 Drawing Sheets

OTHER PUBLICATIONS

Routkevitch et al., "Electrochemical Fabrication of CdS Nanowire Arrays in Porous Anodic Aluminum Oxide Templates", American Chemical Society, Journal of Phys. Chem., vol. 100, No. 33, pp. 14037-14047, 1996.

Sellmyer et al., "Magnetism of Fe, Co and Ni Nanowires in Self-Assembled Arrays", Journal of Physics: Condensed Matter 13 (2001), pp. R433-R460.

Muller et al., "Highly Resolved Electric Force Microscopy of Metal-filled Anodic Alumina", Applied Surface Science 171, 2001, pp. 125-129.

Schmid, "Materials in Nanoporous Alumina", Journal of Materials Chemistry 12 (2002), pp. 1231-1238.

Choi et al., "Hexagonally Arranged Monodisperse Silver Nanowires with Adjustable Diameter and High Aspect Ratio", Chemical Materials, vol. 15, No. 3, 2003, pp. 776-779.

Sander et al., "Structure of Bismuth Telluride Nanowire Arrays Fabricated by Electrodeposition into Porous Anodic Alumina Templates", Chemical Materials, vol. 15, No. 1, 2003, pp. 335-339.

Shelimov et al., "Template-grown High-density Nanocapacitor Arrays", Applied Physics Letters, vol. 77, No. 11, Sep. 11, 2000, pp. 1722-1724.

Chu et al., "Synthesis and Characterization of Titania Nanostructures on Glass by Al Anodization and Sol-Gel Process", Chemical Materials, vol. 14, No. 1, 2002, pp. 266-272.

Masuda et al., "Fabrication of Gold Nanodot Array Using Anodic Porous Alumina as an Evaporation Mask", Japanese Journal of Applied Physics, vol. 35, 1996, pp. L126-L129.

Li et al., "On the Growth of Highly Ordered Pores in Anodized Aluminum Oxide", Chemical Materials, vol. 10, No. 9, 1998, pp. 2470-2480.

Brevnov et al., "Dynamics and Temperature Dependence of Etching Processes of Porous and Barrier Aluminum Oxide Layers", Electrochimica Acta, 49 (2004), pp. 2487-2494.

Fumeaux et al., "The Formation of Controlled-porosity Membranes from Anodically Oxidized Aluminum", Letters to Nature, vol. 337, Jan. 12, 1989, pp. 147-149.

Shawaqfeh et al., "Fabrication and Characterization of Single Layer and Multi-layer Anodic Alumina Membranes", Journal of Membrane Science 157 (1999), pp. 147-158.

Castner et al., "Fluorinated Surfaces, Coatings, and Films", ACS Symposium Series 787, 2001.

Gorbig et al., "Hydrophobic Properties of Plasma Polymerized Thin Film Gas Selective Membranes", Journal of Membrane Science 138 (1998), pp. 115-121.

Doucoure et al., "Plasma Polymerization of Fluorinated Monomers on Mesoporous Silica Membranes and Application to Gas Permeation", Journal of Membrane Science 117 (1996), pp. 143-150.

Nakajima et al., "Recent Studies on Super-Hydrophobic Films", Monatshefte fur Chemie Chemical Monthly 132, pp. 31-41 (2001).

Quere, "Rough Ideas on Wetting", Physica A 313 (2002), pp. 32-46.

Coulson et al., "Super-Repellent Composite Fluoropolymer Surfaces", Journal Phys. Chem. B, vol. 104, No. 37, 2000, pp. 8836-8840.

Standaert et al., "High Density Fluorocarbon Etching of Silicon in an Inductively Coupled Plasma: Mechanism of Etching Through a Thick Steady State Fluorocarbon Layer", Journal of Vacuum Science Technology A 16(1), Jan./Feb. 1998, pp. 239-249.

Hynes et al., "Pulsed Plasma Polymerization of Perfluorocyclohexane", Macromolecules 29 (1996), pp. 4220-4225.

Mackie et al., "Characterization of Pulsed-Plasma-Polymerized Aromatic Films", Langmuir, vol. 14, No. 5, 1998, pp. 1227-1235.

Coulson et al., "Ultralow Surface Energy Plasma Polymer Films", Chemical Materials, vol. 12, No. 7, 2000, pp. 2031-2038.

Mukhopadhyay et al., "Plasma Assisted Hydrophobic Coatings on Porous Materials: Influence of Plasma Parameters", Journal of Physics D: Applied Physics 35 (2002), pp. 1927-1933.

Zhang et al., "Deposition of Fluoropolymer Films on Si(100) Surfaces by Rf Magnetron Sputtering of Poly (tetrafluoroethylene)", Langmuir, vol. 18, No. 16, 2002, pp. 6373-6380.

Marra et al., "Effect of $H_2$ Addition on Surface Reactions During $CF_4/H_2$ Plasma Etching of Silicon and Silicon Dioxide Films", Journal of Vacuum Science Technology A 15(5), Sep./Oct. 1997, pp. 2508-2517.

Dalacu et al., "Spectroellipsometric Characterization of Plasma-deposited Au/fluoropolymer Nanocomposite Films", Journal of Vacuum Science Technology A 17(3), May/Jun. 1999, pp. 877-883.

Lau et al., "Variable Angle Spectroscopic Ellipsometry of Fluorocarbon Films from Hot Filament Chemical Vapor Deposition", Journal of Vacuum Science Technology A 18(5), Sep./Oct. 2000, pp. 2404-2411.

Miller et al., "An Inductively Coupled Plasma Source for the Gaseous Electronics Conference RF Reference Cell", Journal of Research of the National Institute of Standards and Technology, vol. 100, No. 4, Jul.-Aug. 1995, pp. 427-439.

Lieberman et al., "Principles of Plasma Discharges and Materials Processing", Wiley-Interscience, John Wiley & Sons, Inc., 2005.

Tompkins et al., "Spectroscopic Ellipsometry and Reflectometry", John Wiley & Sons, Inc. 1999.

* cited by examiner

FABRICATION OF AN ANISOTROPIC SUPER HYDROPHOBIC/HYDROPHILIC NANOPOROUS MEMBRANES

CROSS-REFERENCE TO RELATED APPLICATIONS

This application claims priority to U.S. Provisional Patent Application Ser. No. 60/514,224 filed on Oct. 24, 2003, the disclosure of which is incorporated by reference herein in its entirety.

GOVERNMENT RIGHTS

This invention was made with government support under grant Nos. DAAD190210085 awarded by the Army Research Office and F49620-01-1-0168 awarded by the Air Force Office of Scientific Research. The government may have certain rights in the invention.

DESCRIPTION OF THE INVENTION

1. Field of the Invention

The present invention relates to membranes and ordered arrays and methods for their manufacture and, more particularly, relates to anisotropic surfaces of nanoporous membranes and nanopore arrays and methods for their manufacture.

2. Background of the Invention

Nanoporous membranes and nanopore arrays have been used to fabricate a variety of nano-structures. For example, porous anodic aluminum oxide (AAO) is a self-ordered array of straight cylindrical pores. An AAO membrane can have pores with densities as high as $10^8$-$10^{11}$ pores/cm$^2$, where the pores have an average diameter of 5 to 250 nm, and depths of several nanometers to tens of micrometers. AAO membranes have been used as templates to make nanowires, and as masks to fabricate nanodot arrays and to transfer patterns onto substrate materials. These structures have also been used for membrane transport and photonic crystals.

Conventional nanoporous membranes, such as an AAO membrane, can be fabricated by anodizing an aluminum substrate. During anodization, a thin barrier layer of aluminum oxide is formed on the aluminum substrate and a porous layer is formed on the barrier layer. A freestanding AAO membrane can then formed by removing the barrier layer and the substrate.

In order to increase the technological usefulness of AAO membranes, it is desirable for the pore entrance to be chemically different from the pore exit. For example, AAO membranes having two surfaces with different hydrophobicity may be useful for filtration, separation, and gas-liquid transport applications. Increasing the hydrophobicity of surfaces can be accomplished by deposition of a conventional fluorocarbon film. Conventional fluorocarbon films deposited by solution-based methods, however, can result in a film having undesirable qualities, such as, for example, poor durability.

Thus, there is a need to overcome these and other problems of the prior art to provide nanoporous membranes with surfaces having different hydrophobicity and methods to make nanoporous membranes with surfaces having different hydrophobicity.

SUMMARY OF THE INVENTION

According to various embodiments, the present teachings include a method of forming a nanoporous membrane including growing a nanoporous oxide film on a substrate. A nanoporous membrane including a top side and a bottom side can be formed by partially separating the nanoporous oxide film from the substrate. A fluorocarbon film can be formed on the top side of the nanoporous membrane by plasma polymerization.

According to various embodiments, the present teachings also include a method of forming a nanoporous membrane including forming an ordered nanopore array by growing a nanoporous aluminum oxide film on an aluminum substrate. The ordered nanopore array can be separated from the substrate using a voltage reduction procedure. A hydrophobic side of the nanoporous membrane can be formed by depositing a fluorocarbon film on a side of the nanopore array by plasma polymerization.

According to various embodiments, the present teachings further include a nanoporous membrane having a hydrophilic side and a hydrophobic side. The hydrophobic side can comprise a porous oxide film having an average pore diameter of about 150 nm to about 200 nm. The hydrophobic side can comprise a polymerized fluorocarbon film deposited by plasma polymerization on the porous oxide film, wherein the hydrophobic side has an average pore diameter equal to or less than the average pore diameter of the hydrophilic side.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, not to be taken in a limited sense.

FIGS. 1-6 depict exemplary anisotropic nanoporous membranes and methods to make anisotropic nanoporous membranes. In various embodiments, the nanoporous membranes can include a hydrophilic side comprising an aluminum oxide film and a hydrophobic side comprising a polymerized fluorocarbon film deposited by plasma polymerization. For ease of illustration, the present teachings will be described with reference to an anodic aluminum oxide (AAO) membrane having a hydrophobic polymerized fluorocarbon film and methods for its manufacture. One of ordinary skill in the art, however, will understand that the present teachings can be applied to other anisotropic nanoporous membranes made from other materials.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

As used herein, the term "nanoporous membrane" refers to a membrane having pores with diameters from about 5 nm to about 250 nm. As also used herein, the term "anisotropic nanoporous membrane" refers to a nanoporous membrane including a property having a value on the top side of the nanoporous membrane that is different than the value of that property on the bottom side of the nanoporous membrane.

Figure 1:
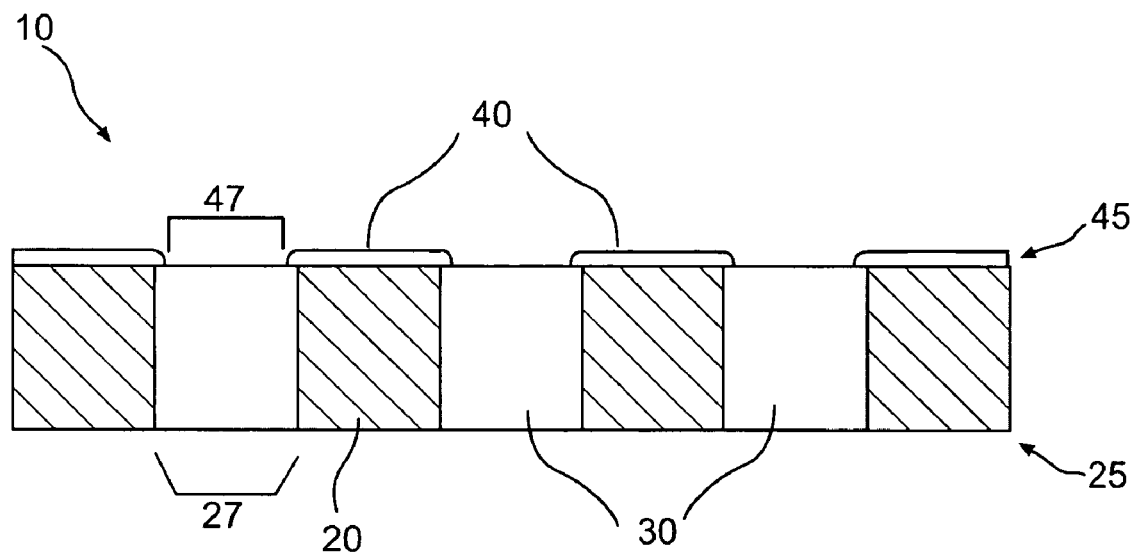
FIG. 1 depicts a cross-sectional view of a nanoporous membrane with a plasma polymerized hydrophobic layer, in accordance with exemplary embodiments of the invention.

According to various embodiments, a cross sectional view of an exemplary anisotropic nanoporous membrane 10 is shown in FIG. 1. Anisotropic nanoporous membrane 10 can include a porous layer 20 including a plurality of pores 30, and a plasma polymerized fluorocarbon film 40. Porous layer 20 can be made of, for example, aluminum oxide. In various other embodiments, porous layer 20 can be an oxide comprising, for example, titanium, tin, and nickel. Each of the plurality of pores 30 can be about 5 nm to about 250 nm in diameter, and about 3 nm to many millimeters in length. As will be discussed herein, in various embodiments, pore diameter and pore density can be controlled by an anodization voltage and an acid solution concentration, and pore length can be controlled by an anodization time. The plurality of pores 30 can be self-ordered to have a hexagonal order, at least in a short range.

Plasma polymerized fluorocarbon film 40 can be about 50 nm to about 300 nm thick. Plasma polymerized fluorocarbon film 40 can be characterized by branched, disordered, and cross-linked chains. The composition of plasma polymerized fluorocarbon film 40 can comprise, for example, 70% or more $CF_2$, $CF$, and $CF_3$ species. Those species, in an amount of 70% or more, can impart hydrophobic properties to plasma deposited polymerized fluorocarbon film 40. In various embodiments, 30% or less of plasma deposited polymerized fluorocarbon film 40 can comprise $C=C$ and $C=CF_x$ species. Those double bonded species, while reducing the hydrophobicity, can also improve mechanical strength. In addition to affecting hydrophbicity, plasma polymerized fluorocarbon film 40 can also reinforce and/or preserve the integrity of a brittle matrix material.

In various embodiments, the anisotropic parameter of anisotropic nanoporous membrane 10 can be, for example, hydrophobicity. Anisotropic nanoporous membrane 10 can include a hydrophobic side 45 and a hydrophilic side 25. Sessile water contact angle ($\theta_{SW}$) measured at 25° C., which can be used as an indicator of hydrophobicity, can be about 140° or more for hydrophobic side 45 of membrane 10. In contrast, $\theta_{SW}$ can be about 10° or less for hydrophilic side 25. An average pore opening diameter 47 on hydrophobic side 45 can be, for example, about 50 nm to about 150 nm. An average pore opening diameter 27 on hydrophilic side 25 can be, for example, about 150 nm to about 200 nm.

Figure 2:
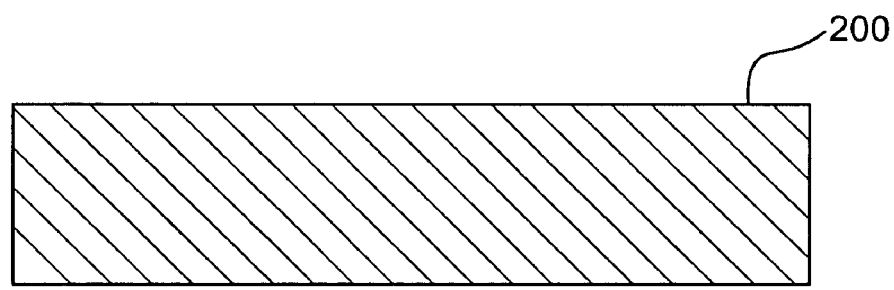
FIG. 2 depicts a cross-sectional view of a substrate in accordance with exemplary embodiments of the invention.

Methods for fabrication of exemplary nanoporous membranes will now be described. Referring to FIG. 2, a substrate 200 is shown. Substrate 10 can be, for example, aluminum. In various embodiments, substrate 10 can also comprise at least one of titanium, tin, and nickel.

Figure 3:
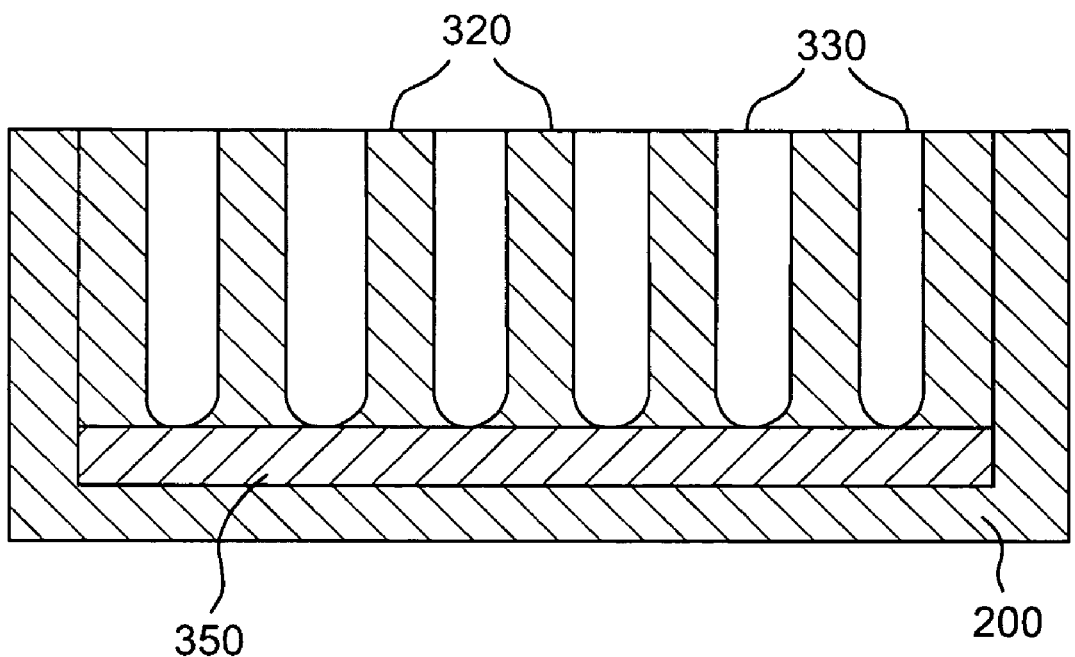
FIG. 3 depicts a cross-sectional view of a barrier layer on a substrate and a porous layer on the barrier layer, in accordance with exemplary embodiments of the invention.

In an exemplary embodiment, an AAO array can be formed from substrate 200 by an anodization method. Substrate 200 can be placed in an electrolytic solution and subject to an electric field. Referring to FIG. 3, anodization of substrate 200 using a DC voltage can form a structure including a barrier layer 350 and a porous layer 320 including a plurality of pores 330. During anodization, oxidation of the Al of substrate 200 can produce $Al_2O_3$ at the interface of substrate 200 and barrier layer 350. The thickness of barrier layer 350 depends on the DC anodization voltage. During anodization, however, the thickness of the barrier layer 350 can remain constant because a rate of, for example, $Al_2O_3$ dissolution on the electrolyte side can be equal to the rate of $Al_2O_3$ production on the metal side. The DC anodization voltage and acidity of the electrolyte solution can be varied to control the diameter of pores 330. A thickness of porous layer 320 can be increased by increasing anodization time.

Figure 4:
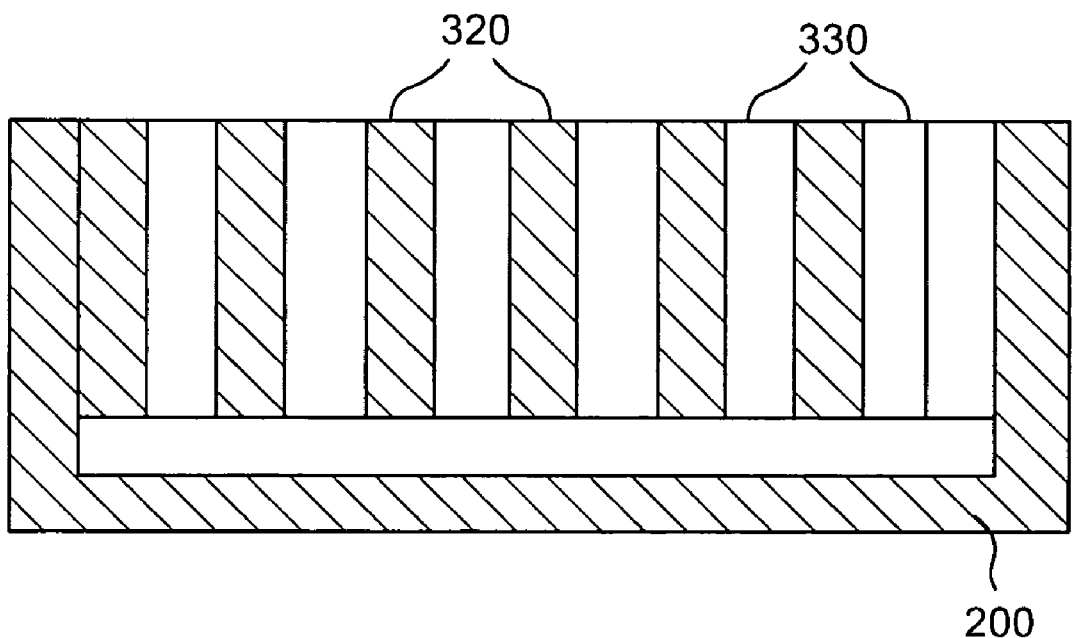
FIG. 4 depicts a cross-sectional view of a barrier layer being removed to partially separate a porous layer from a substrate, in accordance with exemplary embodiments of the invention.

Referring to FIG. 4, porous layer 320 can be partially separated from substrate 200 by removing barrier layer 350. In various embodiments, barrier layer 350 can be removed by a voltage reduction process. For example, a step-wise voltage reduction from the anodization voltage can increase a rate of $Al_2O_3$ dissolution on the electrolyte side relative to the rate of $Al_2O_3$ production on the metal side. As a result, barrier layer 350 decreases in thickness and eventually completely dissolves.

In other various embodiments, porous layer 320 can be partially separated from substrate 200 by removing barrier layer 350 using a mercuric chloride solution.

Figure 5:
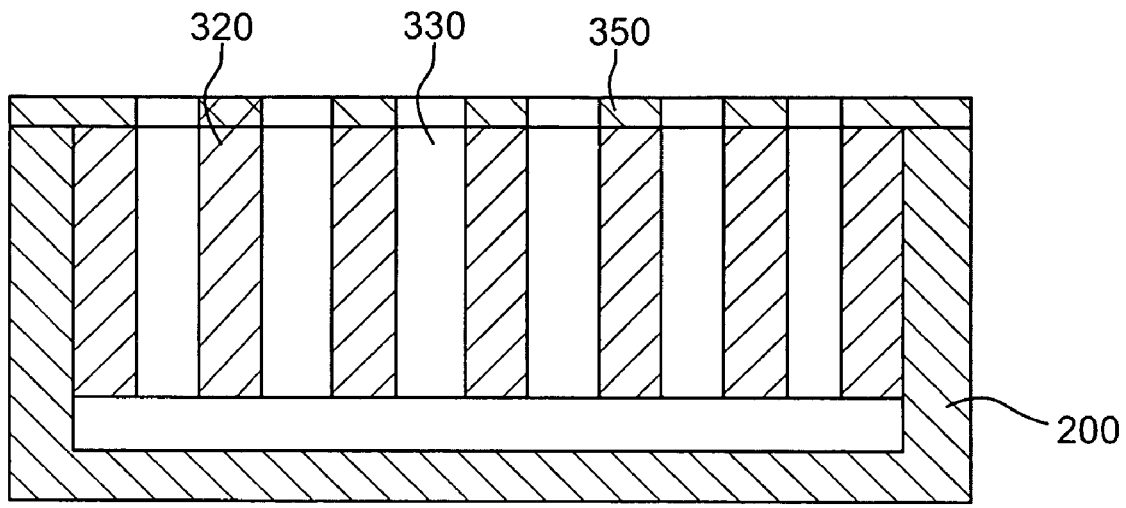
FIG. 5 depicts a cross-sectional view of a plasma polymerized hydrophobic layer on a porous membrane, in accordance with exemplary embodiments of the invention.

A fluorocarbon film can then be deposited on a top surface of porous layer 320. Referring to FIG. 5, fluorocarbon film 350 can be deposited on a top surface of porous layer 320 by a plasma polymerization process using, for example, a $C_4F_8$ plasma discharge. Plasma polymerization uses a plasma source to generate a gas discharge to activate monomers in a feed gas or liquid in order to initiate polymerization and deposit a polymer film. In various embodiments, plasma polymerized fluorocarbon film 350 can be about 50 nm to about 300 nm thick. The thickness of plasma polymerized fluorocarbon film 350 can depend on deposition the time, with the thickness increasing linearly with increasing deposition time. Deposition rate can depend on the source power for plasma polymerization. For example, in various embodiments, a 400 W source power can result in a film growth rate of about 700 nm/min. Increasing source power, for example, to about 500 W to 600 W can cause increased disassociation of the $C_4F_8$ feed gas and, thus, higher film growth rates.

Deposition of plasma polymerized fluorocarbon film 350 by plasma polymerization also preserves the porous structure of porous layer 320. Because the precursor ions generated during plasma polymerization have limited ability to penetrate into pores 330, plasma polymerized fluorocarbon film 350 forms on the top of porous layer 320 rather than in pores 330.

Figure 6:
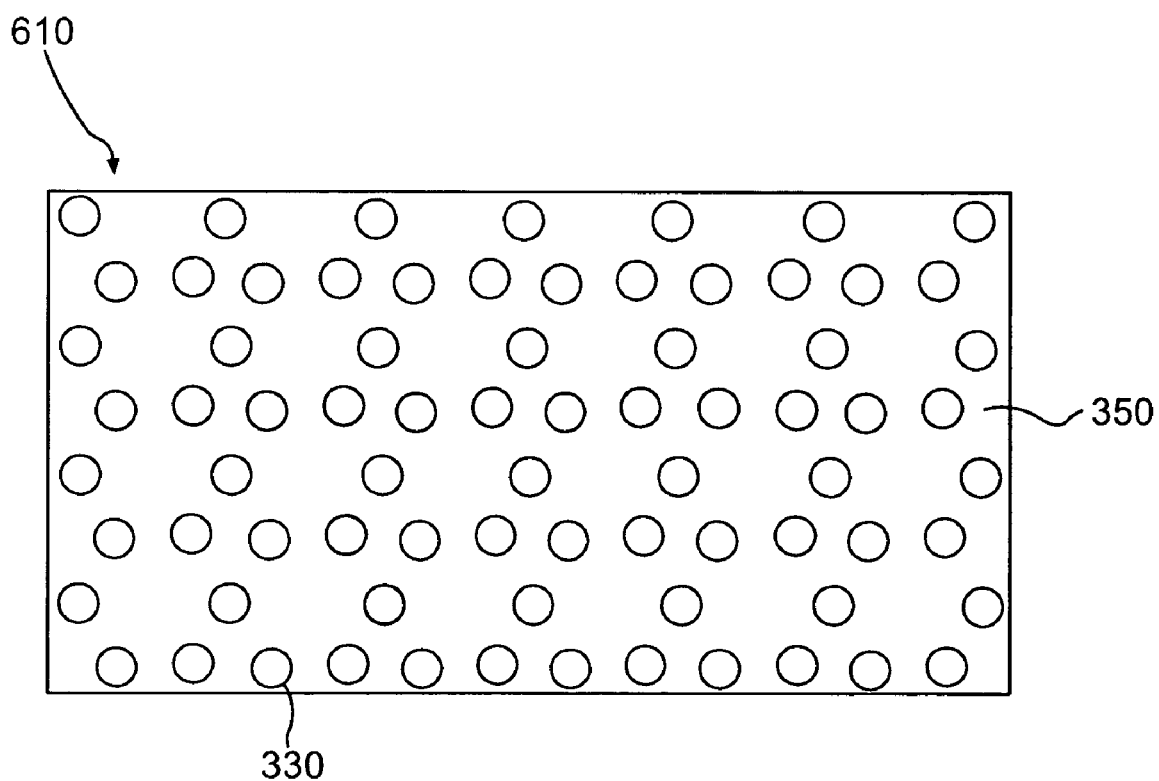
FIG. 6 depicts a top view of a nanoporous membrane with a plasma polymerized hydrophobic layer, in accordance with exemplary embodiments of the invention.

After deposition of plasma polymerized fluorocarbon film 350, an anisotropic nanoporous membrane 610, shown in FIG. 6, can be formed by completely separating porous layer 320 including plasma polymerized fluorocarbon film 350 on the top surface from substrate 200. Complete separation can be accomplished by mechanical methods known to one of ordinary skill in the art, such as cutting, or by chemical methods, such as etching.

Using the methods disclosed herein, nanoporous membranes having differences in hydrophobicity between the top side and the bottom side can be made. Fabrication of a specific example of such an anisotropic hydrophobic/hydrophilic nanoporous membrane will now be described. In various embodiments, the exemplary anisotropic hydrophobic/hydrophilic nanoporous membrane can be formed from an AAO membrane by a two step anodization process. Referring again to FIG. 2, substrate 200 can be an aluminum foil (99.997% purity) with a nominal thickness of about 0.25 μm. Substrate 200 can be degreased with a 1.0 M solution of NaOH, followed by a 50% $HNO_3$ solution, followed by deionized water rinse.

Using a 0.4 M solution of $H_3PO_4$ at about 25° C. as an electrolyte, a first anodization step can be carried out using, for example, a two-electrode cell. A surface area of an electrode can be about 1.4 $cm^2$, defined, for example, by a rubber O-ring. A counter electrode can be, for example, a high surface area platinum mesh. In various embodiments, the heat generated by the anodization processes can be dissipated by bubbling a gas, such as, nitrogen through the electrolyte.

To avoid current overload, a DC voltage source can be used to ramp up the DC voltage at a rate of, for example, 1.0 V/s for 80 seconds to reach the anodization voltage of 80 V. A first anodization can be performed for about 30 minutes to form a first barrier layer and a first porous layer. The first barrier layer and the first porous layer can then be removed by, for example, an etching solution of 0.4 M phosphoric acid and 0.3 M chromic acid. An etching time of about 25 minutes can remove the first barrier layer and the first porous layer. The etching process can be expedited by placing the electrochemical cell in an oven at 70° for about 45 minutes. A second anodiztion can then be performed under similar conditions to the first anodization to grow a second barrier layer and a second porous layer, such as barrier layer 350 and porous layer 320 shown in FIG. 3. The second anodization, however, can last about 4 to about 5 hours to facilitate growth of the porous layer to about 40-50 microns in thickness.

In various embodiments, the barrier layer, such as barrier layer 350 shown in FIG. 3, can be removed by a voltage reduction method. In the voltage reduction method, the voltage can be reduced in a step-wise manner from the anodization voltage of 80 V to 0 V. For example, each stepwise reduction of the voltage can be either 5% of the existing voltage or 0.3 V, whichever is greater, where a new voltage step can be initiated after an anodization current reaches a steady state value. The stepwise voltage reductions can be small enough to allow the uniform thinning of the barrier layer throughout the entire anodized area. In various embodiments, each voltage step can last about 12 to about 17 seconds. Referring again to FIG. 4, the barrier layer can be removed after about 20 minutes, leaving the porous layer, such as porous layer 320, partially separated from the substrate, such as substrate 200. As shown in FIG. 4, removal of barrier layer 350 leaves an AAO membrane comprising porous layer 320 attached to substrate 200 at the periphery of the anodized area.

After anodization, in various embodiments, AAO membrane can be rinsed with deionized water, dried in a stream of nitrogen gas, and transferred to a plasma chamber for plasma polymerization. In various embodiments, a plasma reactor can be an inductively coupled Gaseous Electronics reference cell including a stainless steel vacuum-processing chamber with a base pressure of $10^{-5}$ Torr and a five turn planar coil located at the top of the chamber. Coupling can be achieved through a quartz dielectric window. The coil can be powered at 13.56 MHz by a 0-1000 W radio frequency power supply, such as, for example, made by ENI of Santa Clara, Calif. The AAO membrane to be plasma polymerized can be placed on a powered electrode about 6 cm below the dielectric window and can be maintained at about 20° C. A lower electrode can be powered by a 0-500 W radio frequency power supply, such as, for example, made by ENI of Santa Clara, Calif. The fluorocarbon films can be deposited using a $C_4F_8$ (99.99% purity) plasma discharge maintained at about 15 mTorr, about 50 sccm total gas flow, about 400 W source power, and about 0 W bias power. A deposition time of about 10 seconds can produce a plasma polymerized fluorocarbon film having a thickness of about 120 nm.

After complete separation from the substrate by cutting, the exemplary anisotropic hydrophobic/hydrophilic nanoporous membrane can have a structure as shown in FIG. 1. Referring to FIG. 1, exemplary anisotropic hydrophobic/hydrophilic nanoporous membrane 10 can have a hydrophobic side 45 having a pore diameter 47 of about 80 nm and a hydrophilic side 25 having a pore diameter 27 of about 160 nm. Hydrophobic side 45 can have a sessile water contact angle ($\theta_{SW}$) measured at 25° C. of about 145° and hydrophilic side 25 can have a sessile water contact angle ($\theta_{SW}$) measured at 25° C. of less than 5°.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of forming a nanoporous membrane comprising:
   growing a nanoporous oxide film on a substrate;
   forming a nanoporous membrane comprising a top side and a bottom side by partially separating the nanoporous oxide film from the substrate;
   depositing a fluorocarbon film on the top side of the nanoporous membrane by plasma polymerization.

2. The method of forming a nanoporous membrane of claim 1, wherein the step of growing a nanoporous oxide film on a substrate comprises:
   subjecting the substrate to a first anodization to form a first oxide film on the substrate;
   etching the substrate to remove the first oxide film; and
   subjecting the substrate to a second anodization to grow the nanoporous oxide film.

3. The method of forming a nanoporous membrane of claim 1, wherein the first oxide film comprises a porous layer and a barrier layer.

4. The method of forming a nanoporous membrane of claim 1, wherein the step of forming a nanoporous membrane comprising a top side and a bottom side by partially separating the nanoporous oxide film from the substrate comprises:

removing a barrier layer disposed between the nanoporous oxide film and the substrate by reducing a voltage in a step-wise manner from a predetermined voltage to zero voltage; and forming a support structure that connects a portion of the periphery of the nanoporous membrane to the substrate.

5. The method of forming a nanoporous membrane of claim 4, wherein the step-wise voltage reduction is sufficiently small to allow uniform thinning of the barrier layer.

6. The method of forming a nanoporous membrane of claim 1, wherein growing a nanoporous oxide film on a substrate forms a plurality of pores having an average diameter from about 150 nm to about 200 nm.

7. The method of forming a nanoporous membrane of claim 1, wherein depositing a fluorocarbon film on the top side of the nanoporous membrane by plasma polymerization forms a plurality of pores having an average diameter from about 50 nm to about 150 nm.

8. The method of forming a nanoporous membrane of claim 7, wherein the plurality of pores are hexagonally ordered.

9. The method of forming a nanoporous membrane of claim 1, wherein the step of depositing a fluorocarbon film on the top side of the nanoporous membrane by plasma polymerization comprises generating a gas discharge comprising $C_4F_8$.

10. The method of forming a nanoporous membrane of claim 4, further comprising separating the nanoporous membrane from the substrate by removing the support structure.

11. The method of forming a nanoporous membrane of claim 1, wherein the substrate is one of aluminum, titanium, tin, and nickel.

12. A method of forming a nanoporous membrane comprising:

forming an ordered nanopore array by growing a nanoporous aluminum oxide film on an aluminum substrate;

partially separating the ordered nanopore array from the substrate using a voltage reduction procedure to form a nanoporous membrane; and forming a hydrophobic side of the nanoporous membrane by depositing a fluorocarbon film on a side of the nanopore array by plasma polymerization.

13. The method of forming a nanoporous membrane of claim 12, further comprising separating the nanopore array from the substrate.

14. The method of forming a nanoporous membrane of claim 12, wherein the step of forming an ordered nanopore array by growing a nanoporous aluminum oxide film on an aluminum substrate comprises:

anodizing the aluminum substrate to form a first aluminum oxide film on the substrate;

etching the aluminum substrate to remove the first aluminum oxide film; and anodizing the aluminum substrate to form a second aluminum oxide film.

15. The method of forming a nanoporous membrane of claim 12, wherein the voltage reduction procedure comprises reducing an anodization voltage in a step-wise manner from a predetermined voltage to zero.

16. The method of forming a nanoporous membrane of claim 12, wherein the step-wise voltage reduction is one of 5% of an existing voltage and 0.3 Volts.

17. The method of forming a nanoporous membrane of claim 12, wherein the ordered nanopore array has an average pore diameter of about 150 nm to about 200 nm.

18. The method of forming a nanoporous membrane of claim 12, wherein the hydrophobic side of the nanoporous membrane has an average pore diameter of about 50 nm to about 150 nm.

19. A nanoporous membrane comprising:

a hydrophilic side of the nanoporous membrane comprising a porous oxide film; and a hydrophobic side of the nanoporous membrane comprising a polymerized fluorocarbon film deposited by plasma polymerization on the porous oxide film, wherein the hydrophobic side has an average pore diameter equal to or less than an average pore diameter of the hydrophilic side.

20. The nanoporous membrane of claim 19, wherein the hydrophilic side has a sessile water contact angle of about 10° or less.

21. The nanoporous membrane of claim 19, wherein the hydrophobic side has a sessile water contact angle of about 140° or more.

22. The nanoporous membrane of claim 19, wherein the oxide film has a thickness of about 40 microns to about 50 microns.

23. The nanoporous membrane of claim 19, wherein polymerized fluorocarbon film has a thickness of about 50 nm to about 300 nm.

24. The nanoporous membrane of claim 19, wherein the porous oxide film comprises at least one of aluminum oxide, titanium oxide, tin oxide, and nickel oxide.

* * * * *